(12) United States Patent
Terlecki et al.

(10) Patent No.: US 7,861,534 B2
(45) Date of Patent: Jan. 4, 2011

(54) METHOD OF STARTING TURBINE ENGINE FROM LOW ENGINE SPEED

(75) Inventors: Andrej Terlecki, Mississauga (CA); Graham Bridges, Mississauga (CA); Christopher Day, Burlington (CA); Mark Laderman, Toronto (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 862 days.

(21) Appl. No.: 11/743,767

(22) Filed: May 3, 2007

(65) Prior Publication Data

US 2008/0271461 A1 Nov. 6, 2008

(51) Int. Cl.
*F02C 7/22* (2006.01)
(52) U.S. Cl. .................... 60/778; 60/39.281
(58) Field of Classification Search .............. 60/39.281, 60/772, 790, 778
See application file for complete search history.

(56) References Cited

U.S. PATENT DOCUMENTS

| | | | | |
|---|---|---|---|---|
| 2,923,129 | A | * | 2/1960 | Schwede ............... 60/39.281 |
| 3,418,805 | A | * | 12/1968 | Barish et al. ............ 60/39.281 |
| 3,667,218 | A | | 6/1972 | Davis |
| 4,296,600 | A | * | 10/1981 | Abo et al. ............... 60/39.281 |
| 4,464,895 | A | | 8/1984 | Morrison et al. |
| 5,101,619 | A | | 4/1992 | Morris et al. |
| 5,129,221 | A | | 7/1992 | Walker et al. |
| 5,165,223 | A | | 11/1992 | Ingham et al. |
| 5,212,943 | A | | 5/1993 | Harris |
| 5,231,822 | A | | 8/1993 | Shekleton |
| 5,409,169 | A | * | 4/1995 | Saikalis et al. ............. 239/404 |
| 5,735,116 | A | | 4/1998 | Mouton |
| 6,357,219 | B1 | | 3/2002 | Dudd, Jr. et al. |
| 6,810,676 | B2 | | 11/2004 | O'Connor |
| 6,988,368 | B2 | | 1/2006 | O'Connor |
| 2003/0217545 | A1 | * | 11/2003 | Parsons et al. ........... 60/39.281 |

FOREIGN PATENT DOCUMENTS

WO 02/088531 11/2002

OTHER PUBLICATIONS

International Search Report mailed on Jul. 30, 2008, on Applicant's corresponding PCT International Patent Application No. PCT/CA2008/000695.

* cited by examiner

*Primary Examiner*—Michael Cuff
*Assistant Examiner*—Phutthiwat Wongwian
(74) *Attorney, Agent, or Firm*—Ogilvy Renault LLP (57) ABSTRACT

A method of starting a turbine engine at a first engine speed value which is lower than a second engine speed value designed for a normal engine starting operation, comprises varying a fuel flow into a combustor of the engine to start the engine in repeatedly alternating speed acceleration and deceleration cycles in order to create an engine speed augmentation in each of the speed acceleration and deceleration cycles, thereby achieving the second engine speed value while preventing the engine from being overheated, and then beginning the normal engine starting operation.

13 Claims, 6 Drawing Sheets

METHOD OF STARTING TURBINE ENGINE FROM LOW ENGINE SPEED

TECHNICAL FIELD

The invention relates generally to gas turbine engines and more particularly, to an improved method of starting a turbine engine from a low engine speed.

BACKGROUND OF THE ART

Starting a turbine engine from a very low engine speed with limited rotational assistance can be very difficult. Turbine engine starts initiated at very low engine speeds typically result in a rapid increase in engine turbine temperature. When fuel is introduced into and burned within the engine combustor at a normal, continuous rate which is required to achieve proper fuel atomization, the reduced air flow that results from the low rotational speed of the fan and compressors, causes most of the energy produced during combustion to increase temperatures within the engine's turbine section rather than converting the energy to rotational acceleration of the turbine rotor. Often this results in the need to abort the start in order to avoid the risk of over-temperature damage to the engine components. Conventional engine starting operations require that turbine engine starts be initiated at a predetermined engine speed value which is designed for a standard engine starting operation without the risk of over-temperature damage caused by the reduced air flow. However, under certain conditions such as low batteries or poor "windmill" conditions, it is desirable to start an aircraft turbine engine from an engine speed which is initially below the normal engine start speed.

Accordingly, there is a need to provide an improved method of starting a turbine engine from a low engine speed.

SUMMARY OF THE INVENTION

It is therefore an object of this invention to provide a method of starting a turbine engine.

In one aspect, the present invention provides a method of starting a turbine engine at a first engine speed value which is lower than a second engine speed value designed for a normal engine starting operation, the method comprising varying a fuel flow into a combustor of the engine to start the engine in repeatedly alternating speed acceleration and deceleration cycles in order to create an engine speed augmentation in each of the speed acceleration and deceleration cycles, thereby achieving the second engine speed value while preventing the engine from being overheated, and then beginning the normal engine starting operation.

In another aspect, the present invention provides a method of starting a turbine engine, comprising: a) introducing fuel into a combustor of the engine at an original low value of an engine speed and igniting the fuel, thereby resulting in engine speed acceleration; b) reducing an introduction rate of the fuel to prevent an engine component temperature from reaching a maximum limit, thereby resulting in engine speed deceleration; c) beginning to increase the introduction rate of the fuel before the engine speed falls below the original low value of the engine speed in order to accelerate the engine speed again, thereby obtaining an engine speed augmentation in a speed acceleration and deceleration cycle achieved in previous steps; d) substantially repeating steps (b) and (c) to accumulate engine speed value augmentations obtained in respective speed acceleration and deceleration cycles, wherein step (c) in each cycle is repeated at a higher value of the engine speed with respect to a lower value of the engine speed at which step (c) in a previous cycle began; and e) terminating the speed acceleration and deceleration cycles by introducing the fuel in a rate for a normal engine starting operation when the engine speed reaches a predetermined value to begin the normal engine starting operation.

In another aspect, the present invention provides a method of starting a turbine engine comprising: a) introducing fuel into a combustor of the engine and igniting the fuel at an original low value of an engine speed in order to provide a fuel-on condition for accelerating the engine speed; b) terminating the introduction of the fuel before an engine component temperature reaches a maximum limit, in order to provide a fuel-off condition, thereby resulting in deceleration of the engine speed; c) introducing and igniting the fuel again before the engine speed falls below the original low value of the engine speed, in order to repeat the fuel-on condition for accelerating the engine speed again; d) substantially repeating steps (b) and (c) wherein each repeated fuel-on condition begins at a higher value of the engine speed with respect to a lower value of the engine speed at which a previous fuel-on condition began, thereby forming repeated fuel-on and fuel-off condition cycles; and e) continuously introducing the fuel into the combustor when the engine speed reaches a predetermined value during the fuel-on and fuel-off condition cycles.

Further details of these and other aspects of the present invention will be apparent from the detailed description and drawings included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
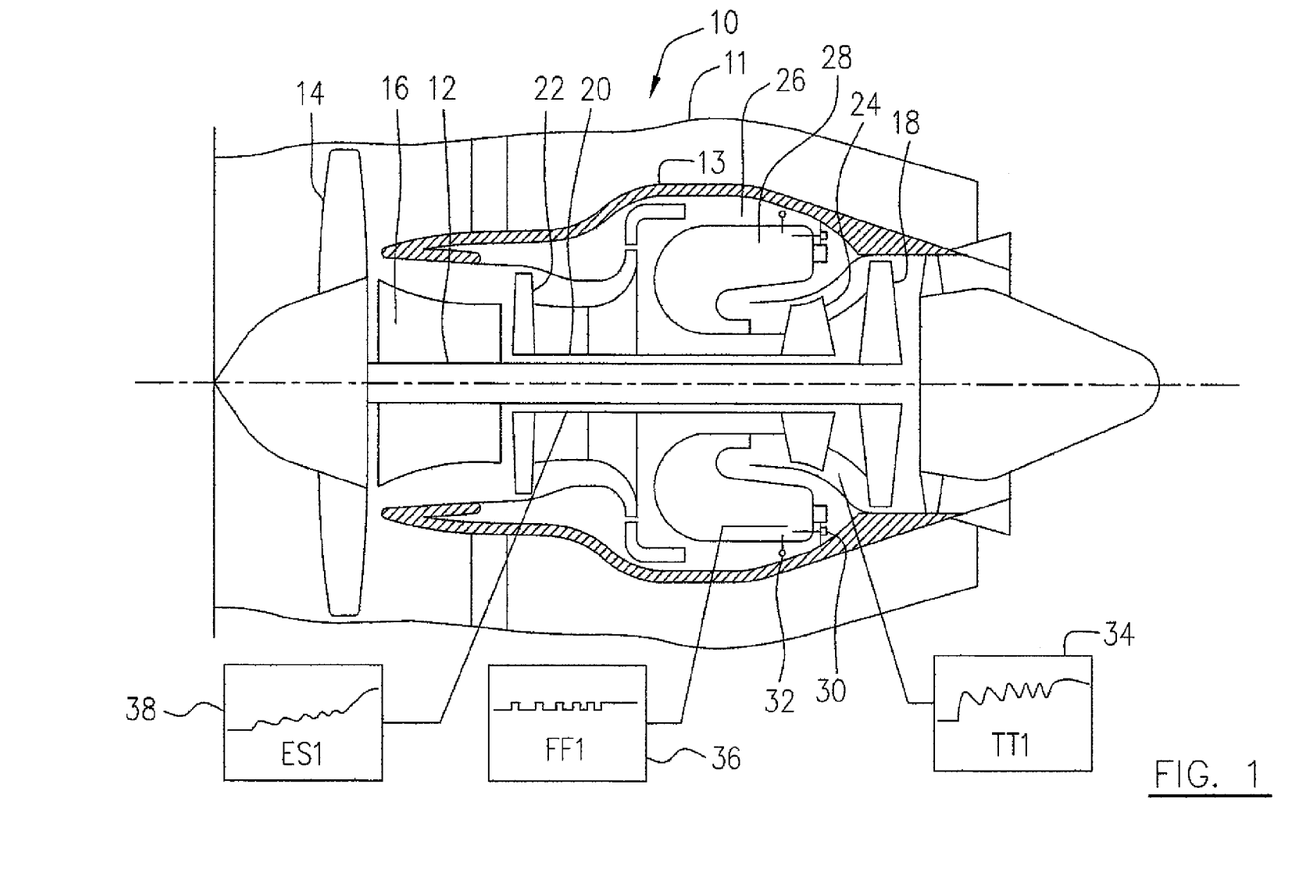
FIG. 1 is a schematic cross-sectional view of a gas turbine engine, as an example, showing an application of the present invention.

FIG. 1 illustrates a gas turbine engine 10 includes a housing or bypass duct 11, a core casing 13, a low pressure spool assembly seen generally at 12 which includes a fan assembly 14, a low pressure compressor assembly 16 and a low pressure turbine assembly 18, and a high pressure spool assembly seen generally at 20 which includes a high pressure compressor assembly 22 and a high pressure turbine assembly 24. The core casing 13 surrounds the low and high pressure spool assemblies 12 and 20 in order to define a core fluid path (not indicated) therethrough, including a chamber 26 containing and surrounding a combustor 28. Fuel injection means 30 are provided for selectively introducing fuel flow into the combustor 28 for powering the engine 10. At least one igniter 32 is provided in the combustor 28 in close proximity to the nozzles (not indicated) of the fuel injection means 30.

Reference will now be made to both FIGS. 1 and 6. During a normal engine speed starting operation, the engine 10 or more particularly the high pressure spool 20, is rotated by a starter (not shown) to provide an airflow (not shown) into the combustor 28. When the rotational speed of the high pressure compressor 22 (which will be referred to as the engine speed hereinafter) reaches a predetermined value which is designed for initiating a normal engine speed starting operation, the electronic engine control (not shown) signals the fuel injecting means 30 to introduce the fuel flow into the combustor 28 to be ignited by the igniter 32. Fuel injecting means 30 continuously introduce fuel into the combustor 28 to complete the engine starting operation until the engine speed reaches an idling speed. Line A in FIG. 6 represents the relationship between turbine temperature and the engine speed increase, between speed value S2 at which the fuel is introduced and ignited for a normal start-assisted engine starting operation and speed value S4 which represents the designed idling speed of the engine.

Figure 6:
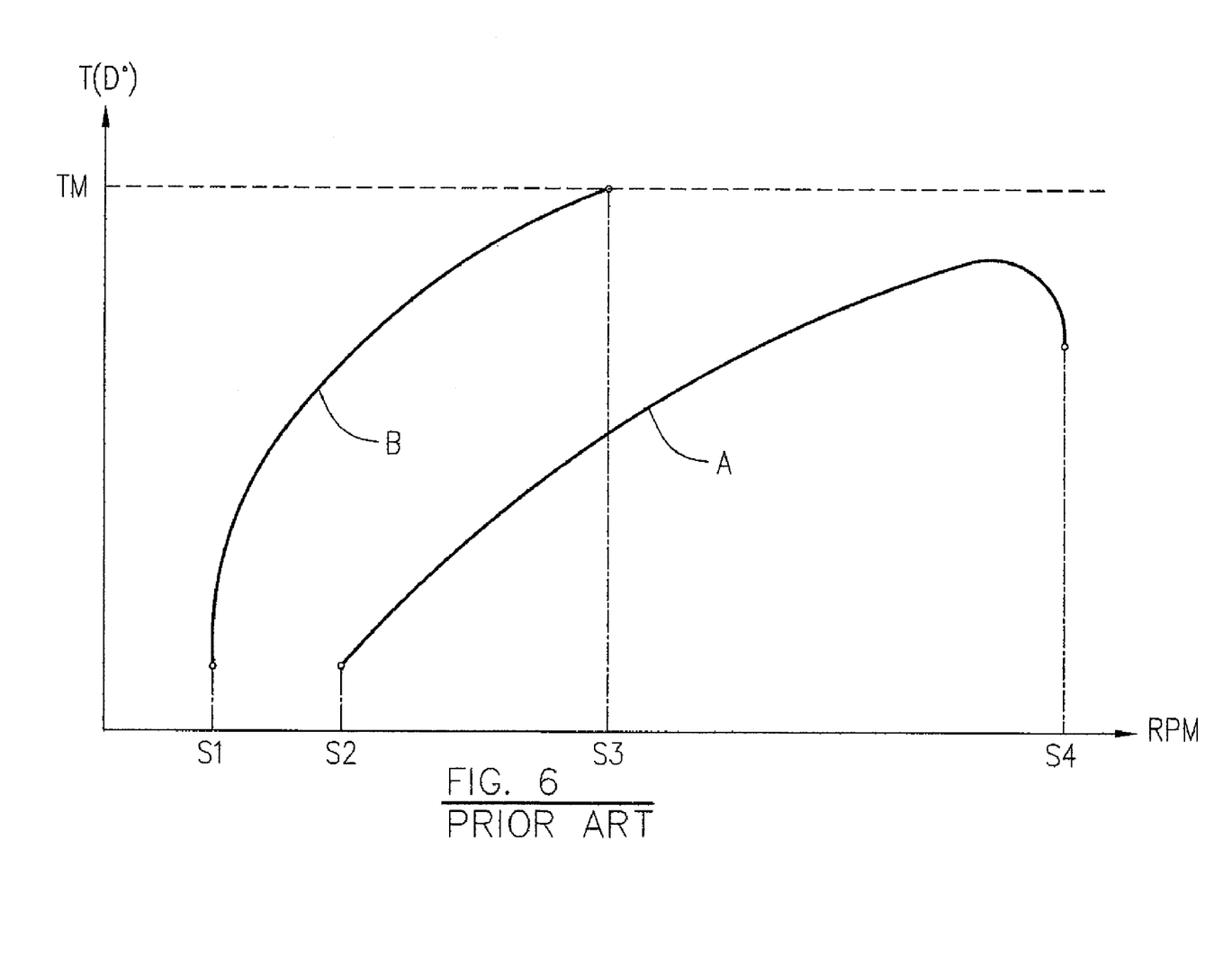
FIG. 6 is a graphical representation of the relationship between turbine temperatures and engine speed in a normal engine speed starting operation and a failed conventional low engine speed starting operation.

Line B in FIG. 6 represents the relationship between turbine temperature and the engine speed increase in an emergency engine starting operation (such as a windmill starting operation) or under abnormal engine starting conditions (such as a weak starter), in which the fuel injecting means 30 introduce the fuel flow into the combustor 28 to be ignited at a low engine speed value S1 to initiate the engine starting operation. Due to a reduced airflow introduced to the combustor 28 for combustion, a richer fuel/air mixture results because it is difficult to reduce the instant fuel flow rate in order to have appropriate fuel atomization. This causes, for example, the turbine temperature to rise rapidly with respect to the engine speed increase, in contrast to the rate of temperature rise during normal start-assisted engine starting operations represented by line A. The turbine temperature or another engine component temperature increase represented by line B may reach a maximum turbine temperature limit which the turbine components can tolerate without sustaining damage TM, when the engine speed reaches only a value S3 which falls far below the engine idling speed S4. Therefore, the low speed engine starting operation represented by line B is forced to be terminated when the engine speed reaches the speed value S3 in order to prevent engine damage and thus the engine starting operation fails.

Figure 2:
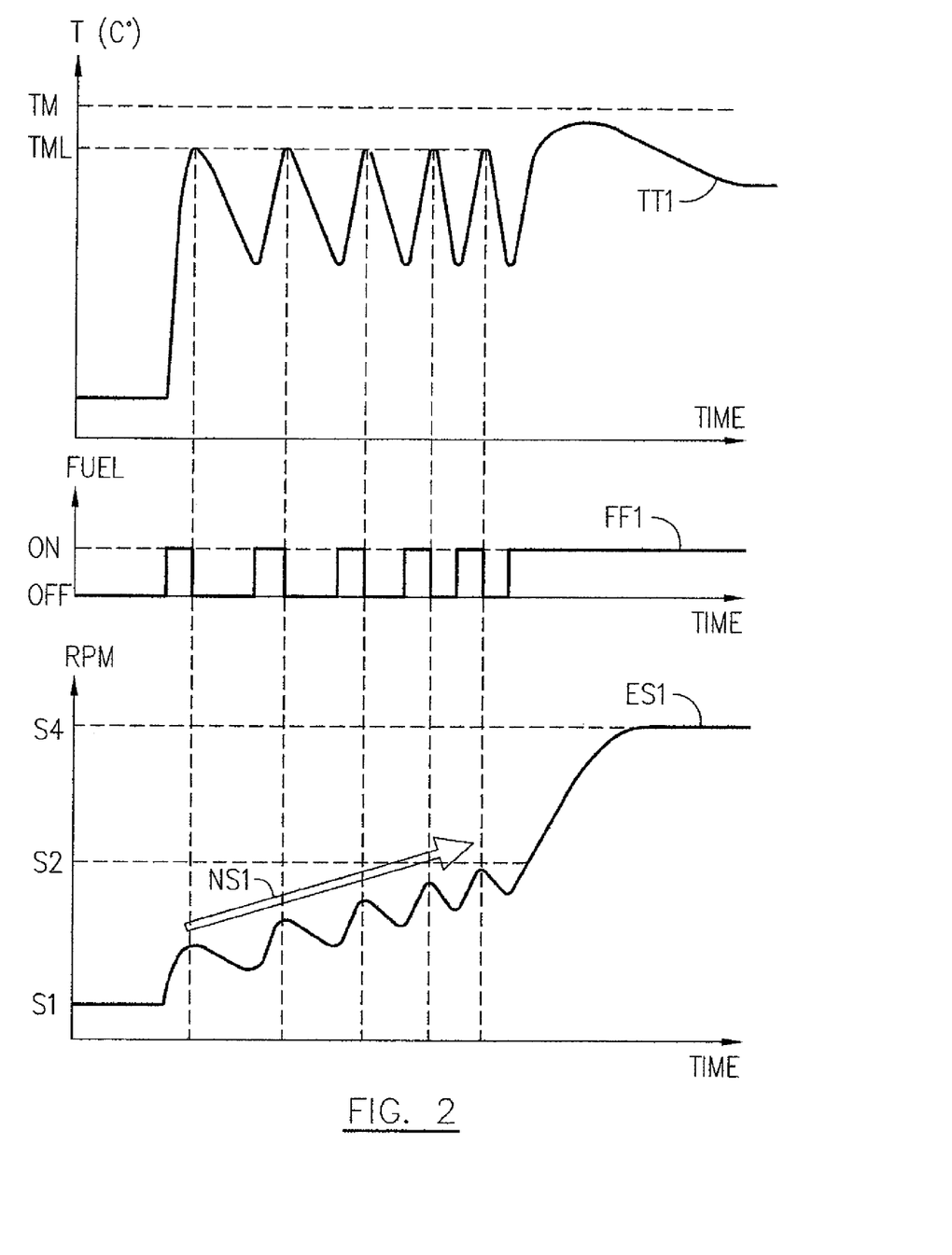
FIG. 2 is a graphical representation showing the related engine temperature, fuel introduction and engine speed profiles according to one embodiment of the present invention.

Referring to FIGS. 1 and 2, a methodology according to the present invention is developed for controlling an engine fuel delivery system such as the fuel injecting means 30 during a beginning period of an engine starting operation from a low original value S1 of the engine speed (shown by line ES1). The fuel control causes a series of heat pulses in the turbine section to prevent rapid temperature rise, as reflected by line TT1, while obtaining a slow and gradual engine speed net increase, as shown by arrow NS1, until the engine speed reaches the value S2 (as shown by line ES1) which is capable of acceleration with continuous fuel flow as performed during a normal engine starting operation. In particular, once fuel flow is introduced and ignited, the heat energy generates some engine speed acceleration and creates turbine temperature rise, but before the turbine temperature approaches a dangerous maximum turbine temperature limit TM, for example, a predetermined marginal level TML below the maximum turbine temperature limit TM, the fuel flow ceases. The engine then begins to cool and the engine speed begins to decelerate. Moments later, once the turbine temperature has cooled sufficiently, but before the engine speed falls below it's original value S1, fuel flow is reintroduced and ignited. A second heat pulse caused by the fuel control introducing fuel, and burning of the fuel air mixture to provide further speed acceleration to the engine. Again, when the turbine temperature approaches the temperature marginal level TML, the fuel flow ceases. This process is repeated in series wherein the fuel flow is repeatedly introduced and ignited before the engine speed falls below a value at which a previous engine speed acceleration began. Therefore, the engine speed fluctuates in repeated acceleration and deceleration cycles, resulting in a steady increase of the engine net speed. The pulsing fuel flow is represented by FF1 having respective fuel-on and fuel-off points.

Lines TT1, FF1 and ES1 are also shown in blocks 34, 36 and 38 in FIG. 1, as examples to illustrate the characteristics of the present invention.

When the engine 10 attains a high enough engine speed value such as S2 designed for a normal engine starting operation, the increased air flow into the combustor 32 allows greater transference of the combustor energy to turbine rotor acceleration, and therefore the fuel can remain on continuously and the engine speed can be continuously accelerated during the remainder of the engine starting operation to the designed engine idling speed S4 without exceeding the maximum turbine temperature limits TM, as in a normal engine starting operation initiated from speed value S2.

According to the low engine speed start methodology of the present invention, a successful start operation is based on a correct selection of fuel-on and fuel-off points as determined by the engine's rise and subsequent fall-back of both turbine temperature and engine speed. Fuel-on and fuel-off points in the fuel flow pulse cycles are preferably timed to provide a steady net acceleration with a sufficient margin of thermal limitations. Parameters for controlling the fuel flow pulse cycles (fuel-on and fuel-off points) can be selected based on turbine temperature, engine speed, a combination of the two, or can be based on time, and can be variable depending upon ambient and engine conditions and the rate of progression through the start operation. The present invention will be further described with reference to those specific control issues in various embodiments.

The advantage of this methodology according to the present invention is that it permits a start operation from a low engine speed at which a normal (continuous fuel flow) engine starting operation would be impossible without exceeding thermal limitations. Also, this methodology according to the present invention, is capable of conducting a slow engine speed starting operation with the normal engine fuel delivery system, and thus avoids the need for additional "low-flow" (starting) fuel nozzles.

Figure 3:
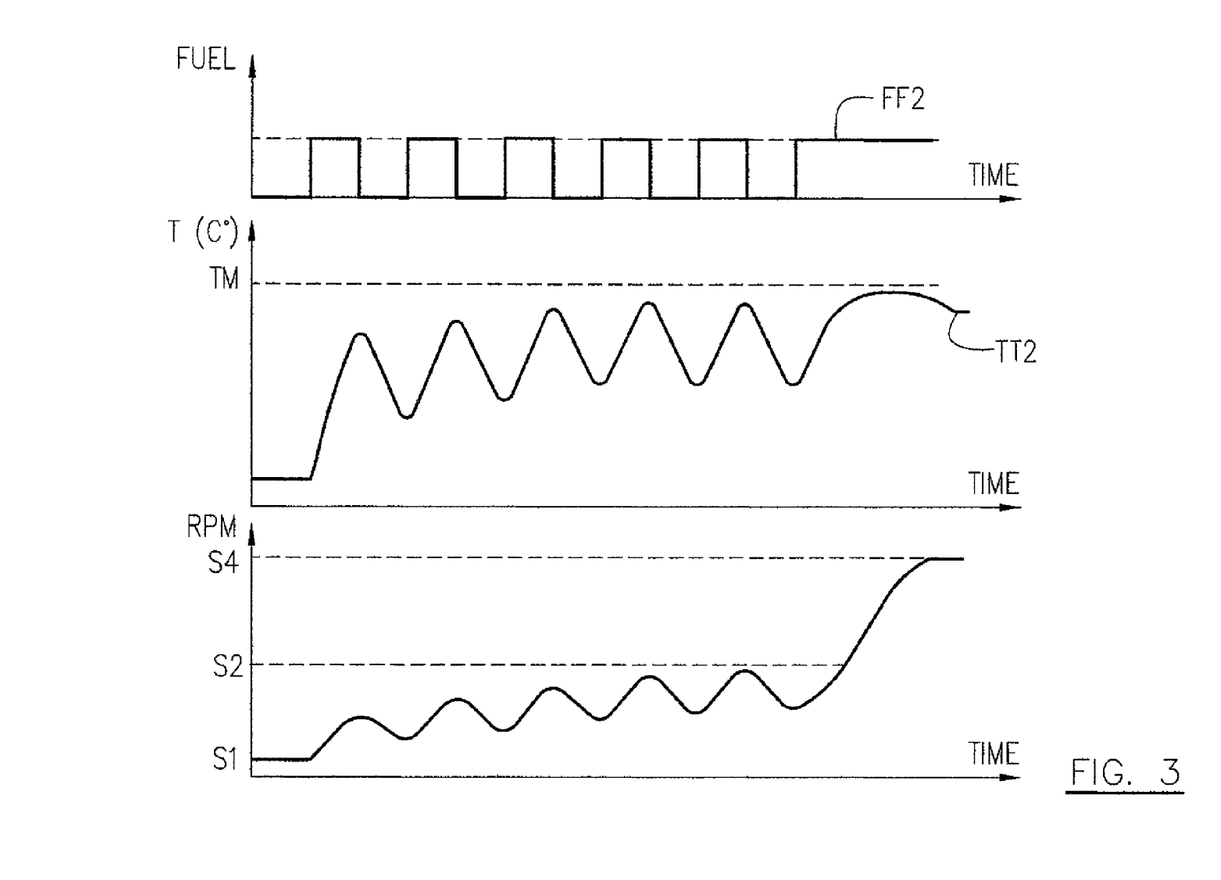
FIG. 3 is a graphical representation similar to that of FIG. 2, showing a timed pulse control in a low engine speed starting operation according to another embodiment of the present invention.

Reference is now made to FIG. 3 in which the low engine speed starting operation according to one embodiment of the present invention, uses a fuel pulse time schedule as the primary controller. As reflected by line FF2, the fuel-on and fuel-off cycles take substantially equal time periods and may be adjusted by the frequency of the fuel-on and fuel-off pulse cycles. A frequency of the fuel-on and fuel-off pulse cycles, for example, higher than 1 Hz is not suggested. The delay between fuel introduction time and the time point when actual light-off is established, causes too much variation to consistently control the engine starting operation and the turbine temperatures. For this reason, a lower frequency of the fuel-on and fuel-off pulse cycles, for example, 0.5 Hz or lower, preferably provides a more consistent performance of the low engine speed starting operation. However, a suitable frequency of the fuel-on and fuel-off pulse cycles may vary for different types of engines.

Although FF2 shows a flat fuel flow rate in each pulse, at the beginning of each pulse, fuel flow levels may be higher to attain better atomization in order to achieve a good light-off and flame propagation. The timing and magnitude of the various fuel pulses may be adjusted to provide a consistent start performance for a small range of altitudes and low engine rotor speed (windmill conditions). This may be achieved with very little margin to the maximum turbine temperature limit TM and can provide a positive net speed acceleration during fuel pulsing. When a sufficiently high engine speed value S2 is achieved, the fuel flow then remains on continuously, and the engine speed is successfully accelerated during the remainder of the start operation to the idling speed value S4, which is similar to a normal engine starting operation.

It is relatively simple and convenient to use the fuel pulse time schedule as the primary controller for a low engine speed start operation. Nevertheless, care and caution are needed for other variations, such as fuel flow calibration, ambient and/or engine pre-start conditions, light-off time, etc. which may affect the performance of the low engine speed starting operation. Other embodiments of the present invention are optional.

Figure 4:
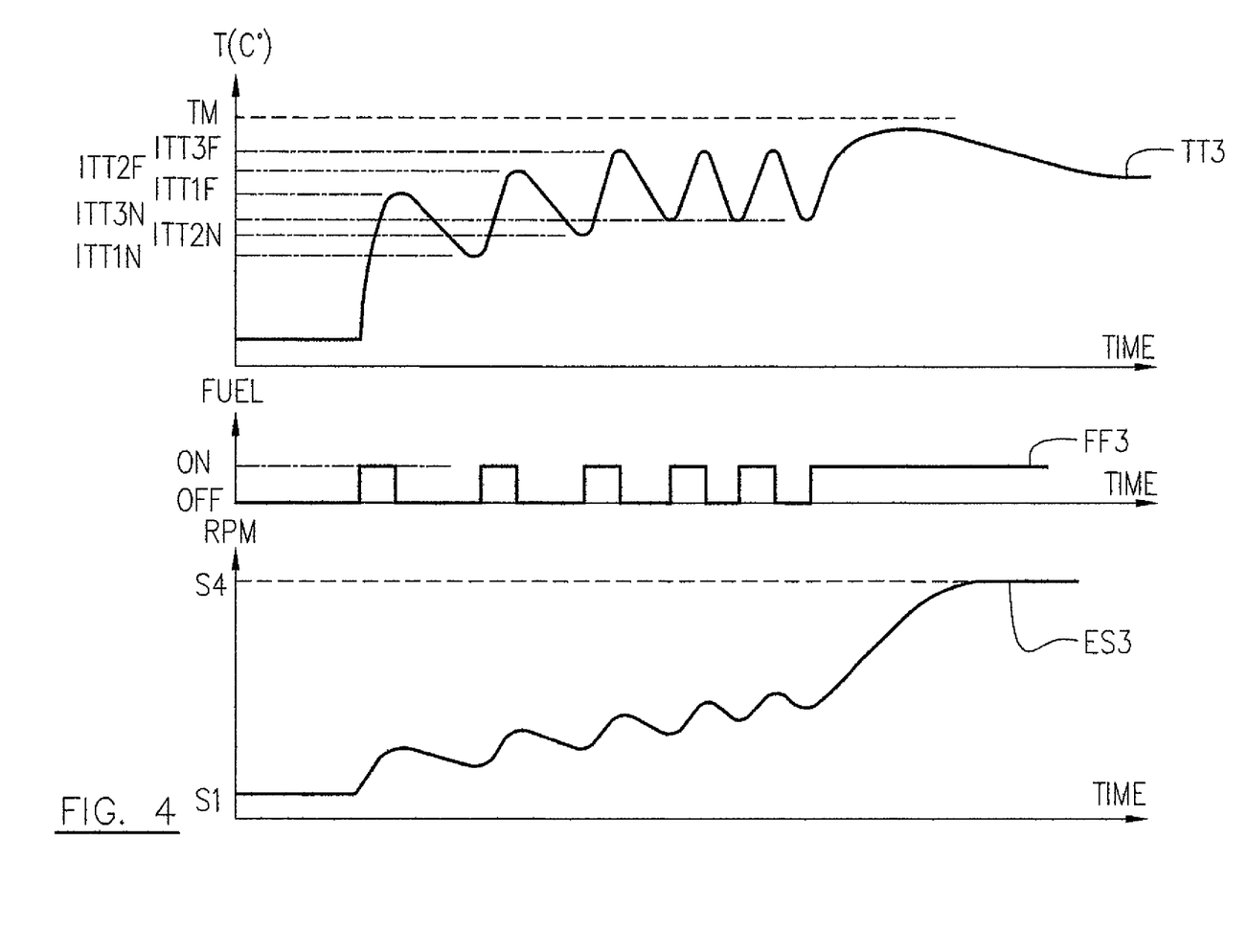
FIG. 4 is a graphical representation similar to that of FIG. 2, showing turbine temperature limit control in the low engine speed starting operation according to a further embodiment of the present invention.

Referring to FIG. 4, control of the fuel flow between the fuel-on and fuel-off conditions is based upon a measured instant turbine (or another engine component) temperature value (ITT), instead of predetermining when to switch off the fuel flow based on time as described in the previous embodiment. A software may be compiled to set the fuel-off points in the fuel flow pulse cycles shown by line FF3, based upon a predetermined value of ITT such as ITT1F, ITT2F and ITT3F, associated with line TT3. In operation, the turbine temperature is monitored, for example, by continuously measuring the exhaust gas temperature and obtaining a measured instant turbine temperature value. When the measured instant turbine temperature value reaches the predetermined ITT value, the fuel flow is switched to the fuel-off condition. The predetermined ITT value such as ITT1F, ITf2F and ITT3F for fuel-off points in the respective heat pulse cycles, reflected by the line TT3, may be different one to another as shown in FIG. 4, or may be substantially equal. The predetermined ITT value is always below the maximum turbine temperature limit TM.

This embodiment ensures that during each of the heat pulse cycles, the engine attains maximum acceleration as allowed by the maximum turbine temperature limit (when a predetermined ITT value is set close to the maximum turbine temperature limit TM) before the fuel flow is terminated.

Optionally, the measured instant ITT value may be used to provide the fuel-on control, thus ensuring that the engine is cooled sufficiently from the previous heat pulse to allow the next heat pulse to provide a reasonable fuel burn time and provide a significant rotor acceleration, as shown with line ES3. The predetermined ITT value, for example, ITT1N, ITT2N and ITT3N for the fuel-on points in the respective heat pulse cycles may be different one from another as shown with line TT3, or may optionally be equal.

It is also optional that the predetermined ITT values defined for the fuel-on and fuel-off points in the first fuel flow pulse cycles, may be modified, for example, as gradually increasing, so as to provide an additional thermal margin and better acceleration later in the engine starting operation. As an example, a software for the fuel control used in this embodiment of the present invention, may be modified to provide separate ITT values for the fuel-off and fuel-on points for a number of the pulse cycles (the number depends on the type of engine, operative conditions, etc., but has generally been found to be less than 10 or 20 cycles) in order to achieve a sufficiently large windmill start envelope. This embodiment advantageously maintains acceptable temperature margins during the engine starting operation. The actual fuel delivery schedule (magnitude) for each of the fuel flow pulses is also variable and optimized as a factor of the engine speed and the ambient conditions.

Figure 5:
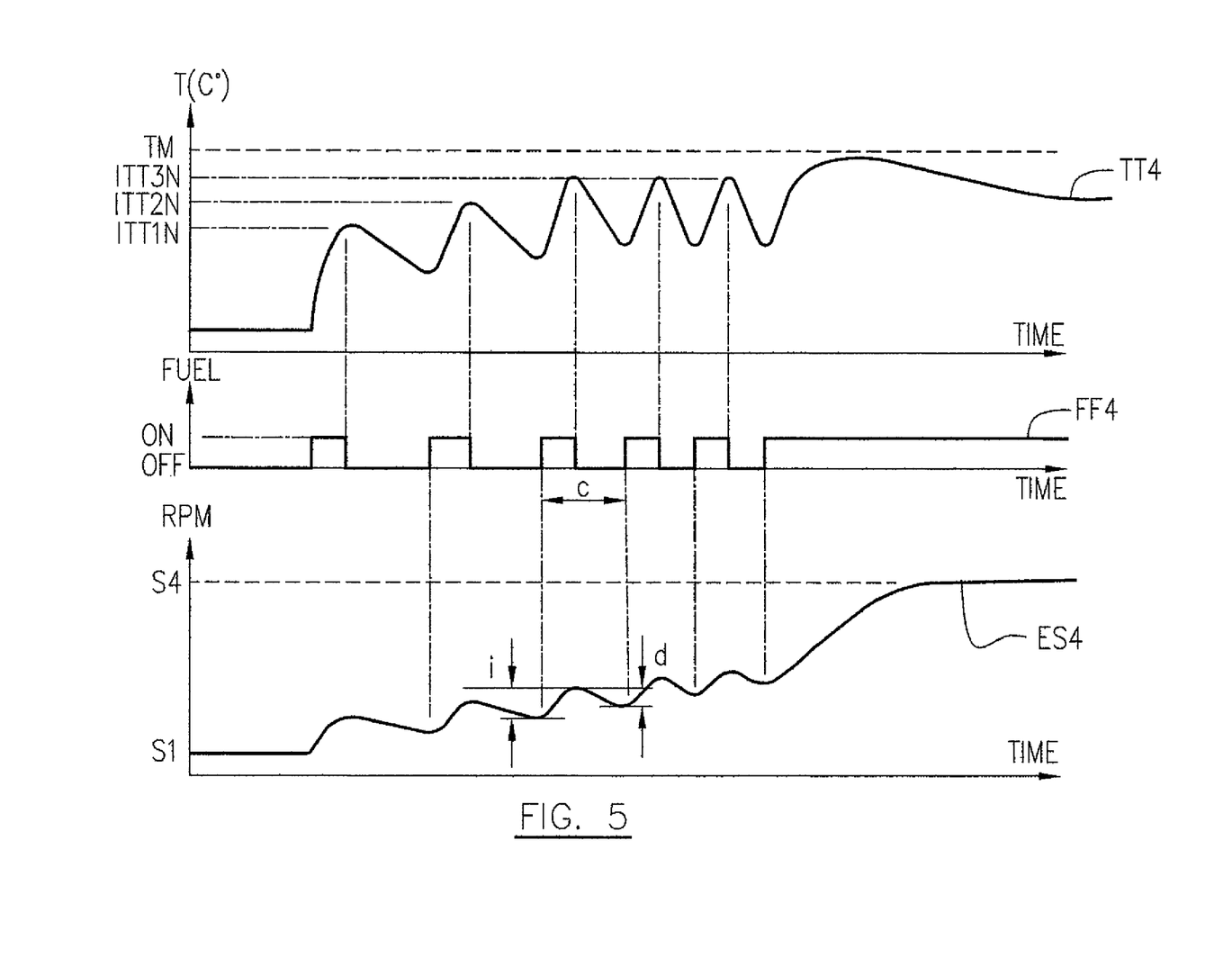
FIG. 5 is a graphical representation similar to that of FIG. 2, showing a fuel-on control based on engine speed in a low engine speed starting operation according to a still further embodiment of the present invention.

Referring now to FIG. 5, a further embodiment of the present invention has further improved upon the previous embodiments, by using predetermined ITT value(s) to trigger the fuel-off points and by using engine speed as a control for fuel-on points. Lines TT4, FF4 and ES4 represent the respective turbine temperatures, fuel flow rates and the engine speed with respect to time, to illustrate the characteristics of the low engine speed starting operation according to this embodiment.

During the engine starting operation, the engine speed is measured and a varying instant engine speed decrease value indicated by d, under the fuel-off condition in one of the fuel-on and fuel-off pulse cycles (indicated by c), is monitored. This monitored varying instant engine speed decrease value d is continuously compared with a measured engine speed increase value (indicated by i) resulting from the fuel-on condition in the same fuel-on and fuel-off pulse cycle c in order to calculate a varying ratio d/i. When the varying ratio d/i reaches a predetermined ratio value which is preferably smaller than but close to 1, the fuel-off condition is switched to the fuel-on condition to start a next fuel-on and fuel-off pulse cycle. This predetermined ratio value may be defined differently, depending upon engine/ambient conditions and engine speed progression through the engine starting operation. This embodiment advantageously ensures a speed value augmentation in each of the speed acceleration and deceleration cycles (also in each of the fuel-on and fuel-off pulse cycles) to provide the engine speed net increase during the starting operation while the turbine temperature is ensured to be below the maximum turbine temperature limit.

The above description is meant to be exemplary only, and one skilled in the art will recognize that changes may be made to the embodiments described without departing from the scope of the invention disclosed. For example, varying fuel flow rates as described in the above embodiments is in on and off pulse cycles. However, the fuel flow rate may be varied in other patterns other than the on and off pulse cycles to achieve engine speed acceleration and deceleration cycles to obtain a gradual net speed increase while preventing the resultant heat pulses from causing the engine to reach a maximum turbine temperature limit. Still other modifications which fall within the scope of the present invention will be apparent to those skilled in the art, in light of a review of this disclosure, and such modifications are intended to fall within the appended claims.

The invention claimed is:

1. A method of starting a turbine engine at a first engine speed value which is lower than a second engine speed value designed for a normal engine starting operation, the method comprising varying a fuel flow into a combustor of the engine in repeatedly alternating fuel-on and fuel-off pulse cycles to establish a light-off condition in each of the pulse cycles and then igniting the fuel flow in each of the pulse cycles to start the engine in repeatedly alternating speed acceleration and deceleration cycles in order to create an engine speed augmentation in each of the speed acceleration and deceleration cycles, thereby achieving the second engine speed value while preventing the engine from being overheated, and then beginning the normal engine starting operation.

2. The method as defined in claim 1 wherein the fuel-on is switched to the fuel-off in each of the pulse cycles before an engine component temperature reaches a maximum limit.

3. The method as defined in claim 2 wherein the fuel-off is switched to the fuel-on in order to begin a next pulse cycle before an engine speed falls below a value at which the fuel-on of an immediately previous pulse cycle began.

4. A method of starting a turbine engine comprising:
  a) introducing fuel into a combustor of the engine and igniting the fuel at an original low value of an engine speed in order to provide a fuel-on condition for accelerating the engine speed;
  b) terminating the introduction of the fuel before an engine component temperature reaches a maximum limit, in order to provide a fuel-off condition which establishes a light-off condition, thereby resulting in deceleration of the engine speed;
  c) introducing and igniting the fuel again before the engine speed falls below the original low value of the engine speed, in order to repeat the fuel-on condition for accelerating the engine speed again;
  d) repeating steps (b) and (c) wherein each repeated fuel-on condition begins at a higher value of the engine speed with respect to a lower value of the engine speed at which a previous fuel-on condition began, thereby forming repeated fuel-on and fuel-off condition cycles; and
  e) continuously introducing the fuel into the combustor when the engine speed reaches a predetermined value during the fuel-on and fuel-off condition cycles.

5. The method as defined in claim 4 wherein the predetermined value of the engine speed defined in step (e) is a value of the engine speed at which the engine is designed to start in a normal engine starting operation.

6. The method as defined in claim 4 wherein the fuel-on and fuel-off condition cycles are controlled in accordance with a time schedule.

7. The method as defined in claim 4 wherein step (b) is practised each time by:
  measuring the engine component temperature and obtaining a measured instant engine component temperature value; and
  beginning the fuel-off condition when the measured instant engine temperature value reaches a marginal level below the maximum limit of the engine component temperature.

8. The method as defined in claim 4 wherein step (c) is practised each time by:
  measuring the engine component temperature and obtaining a measured instant engine component temperature value; and
  beginning the fuel-on condition when the measured instant engine component temperature value decreases to a predetermined level.

9. The method as defined in claim 4 wherein steps (b) and (c) are practised each time by:
  measuring the engine component temperature and obtaining a measured instant engine component temperature value;
  beginning the fuel-off condition when the measured instant engine component temperature value reaches a marginal level below the maximum limit of the engine component temperature;
  beginning the fuel-on condition when the measured instant engine component temperature value decreases to a predetermined level;
  the marginal level defined for beginning the fuel-off condition in first few cycles being lower than the marginal level defined for beginning the fuel-off condition in following cycles; and
  the predetermined level defined for beginning the fuel-on condition in the first few cycles having a lower value than a value of the predetermined level defined for beginning the fuel-on condition in the following cycles.

10. The method as defined in claim 9 wherein the respective marginal level defined for beginning the fuel-off condition and predetermined level defined for beginning the fuel-on condition in said first few cycles, both increase gradually.

11. The method as defined in claim 8 wherein step (b) is practised by measuring the engine speed and using a measured varying engine speed value to directly control the beginning of the fuel-on condition in each cycle.

12. The method as defined in claim 11 further comprising:
  monitoring a varying engine speed decrease value under the fuel-off condition in one of the fuel-on and fuel-off condition cycles and comparing same with a measured engine speed increase value resulting from the fuel-on condition in said one of the cycles, in order to calculate a varying ratio;
  switching the fuel-off condition to the fuel-on condition of a next one of the cycles when the monitored varying ratio reaches a predetermine ratio value.

13. The method as defined in claim 12 wherein the predetermined ratio value is smaller than 1.

\* \* \* \* \*